(12) United States Patent
Doan et al.

(10) Patent No.: US 10,272,602 B2
(45) Date of Patent: Apr. 30, 2019

(54) METHOD OF MANUFACTURING IN-MOLD DECORATIVE APPLIQUÉ WITH TEXTURED SURFACE

(71) Applicant: FORD GLOBAL TECHNOLOGIES, LLC, Dearborn, MI (US)

(72) Inventors: Linh N. Doan, Belleville, MI (US); James P. Holland, Brighton, MI (US); Kenneth S. Laird, Canton, MI (US); Stacy L. Swank, Auburn Hills, MI (US); Jeffrey B. Crist, Sterling Heights, MI (US); Warwick J. Smith, Grosse Pointe Woods, MI (US); Aileen N. Barraza, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 399 days.

(21) Appl. No.: 15/012,213

(22) Filed: Feb. 1, 2016

(65) Prior Publication Data
US 2016/0144542 A1 May 26, 2016

Related U.S. Application Data

(62) Division of application No. 12/841,221, filed on Jul. 22, 2010, now Pat. No. 9,283,701.

(51) Int. Cl.
*B29C 45/14* (2006.01)
*B29C 45/37* (2006.01)
(Continued)

(52) U.S. Cl.
CPC ...... *B29C 45/1418* (2013.01); *B29C 45/0053* (2013.01); *B29C 45/372* (2013.01);
(Continued)

(58) Field of Classification Search
None
See application file for complete search history.

(56) References Cited

U.S. PATENT DOCUMENTS

| 4,016,235 A * | 4/1977 | Ferro | B29C 33/18 |
| | | | 264/132 |
| 4,205,036 A * | 5/1980 | Trame | B29C 45/14 |
| | | | 264/132 |

(Continued)

*Primary Examiner* — Edmund H Lee
(74) *Attorney, Agent, or Firm* — Vichit Chea; MacMillan, Sobanski & Todd, LLC

(57) ABSTRACT

A manufacturing method for a plastic-molded automotive interior trim component produces a curvilinear finished surface with a relatively flat portion and a relatively curved portion. A decorative film subcomponent is molded with a substantially smooth outer surface that is pigmented with a desired color of the finished surface. The decorative film subcomponent is placed into a mold having a film-receiving surface with a three-dimensional texture at both the relatively flat portion and the relatively curved portion. A structural backing member is in-mold laminated with the decorative film subcomponent by injecting molten plastic material against the inner surface of the decorative film subcomponent in the mold, wherein pressure of the molten plastic material expands the decorative film subcomponent to form an embossed pattern which is substantially uniform and undistorted covering at least part of the relatively flat portion and at least part of the relatively curved portion.

5 Claims, 5 Drawing Sheets

(51) Int. Cl.
  *B32B 3/10* (2006.01)
  *B29C 45/00* (2006.01)
  *B32B 7/12* (2006.01)
  *B29K 105/00* (2006.01)
  *B29L 31/30* (2006.01)

(52) U.S. Cl.
  CPC ............... *B32B 3/10* (2013.01); *B32B 7/12*
    (2013.01); *B29C 2045/0079* (2013.01); *B29C*
    *2045/14213* (2013.01); *B29K 2105/256*
    (2013.01); *B29L 2031/3041* (2013.01); *B32B*
    *2307/75* (2013.01); *B32B 2605/003* (2013.01);
    *Y10T 428/24612* (2015.01)

(56) References Cited

U.S. PATENT DOCUMENTS

| | | | | |
|---|---|---|---|---|
| 4,414,731 | A * | 11/1983 | Riemer | B29C 33/42 |
| | | | | 156/245 |
| 4,562,032 | A * | 12/1985 | Gaudreau | B29C 33/56 |
| | | | | 249/91 |
| 5,514,458 | A | 5/1996 | Schulze-Kadelbach et al. | |
| 5,599,608 | A * | 2/1997 | Yamamoto | B29C 43/021 |
| | | | | 156/233 |
| 5,746,962 | A * | 5/1998 | Yamamoto | B29C 45/14196 |
| | | | | 264/266 |
| RE36,457 | E | 12/1999 | Ellison et al. | |
| 6,019,923 | A | 2/2000 | Pelzer | |
| 6,168,742 | B1 * | 1/2001 | Yamamoto | B29C 45/14 |
| | | | | 264/266 |
| 6,436,329 | B1 * | 8/2002 | Hardgrove | B29C 45/1418 |
| | | | | 264/266 |
| 6,620,371 | B1 * | 9/2003 | Winget | B29C 43/021 |
| | | | | 264/138 |
| 6,878,322 | B2 * | 4/2005 | Yang | B29C 43/021 |
| | | | | 264/132 |
| 7,344,669 | B2 * | 3/2008 | Yamamoto | B29C 45/14196 |
| | | | | 264/247 |
| 7,555,157 | B2 | 6/2009 | Davidson et al. | |
| 7,784,846 | B2 | 8/2010 | Vasko et al. | |
| 2004/0099988 | A1 * | 5/2004 | Cowelchuk | B29C 33/306 |
| | | | | 264/255 |
| 2007/0026201 | A1 | 2/2007 | Botrie et al. | |
| 2007/0269671 | A1 | 11/2007 | Hirschfelder et al. | |
| 2008/0073813 | A1 | 3/2008 | Smith et al. | |
| 2010/0007045 | A1 | 1/2010 | Hsu et al. | |
| 2010/0013260 | A1 | 1/2010 | Vasko et al. | |
| 2010/0148530 | A1 | 6/2010 | Michler | |

* cited by examiner

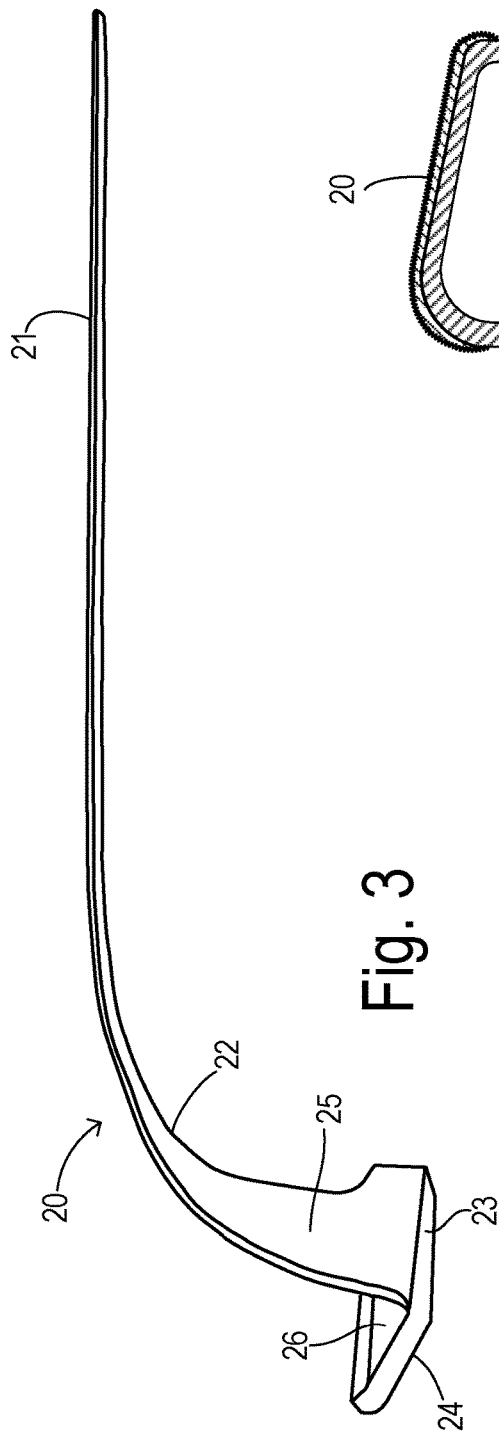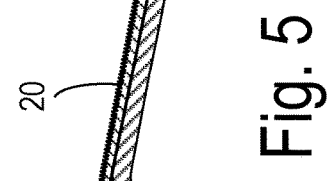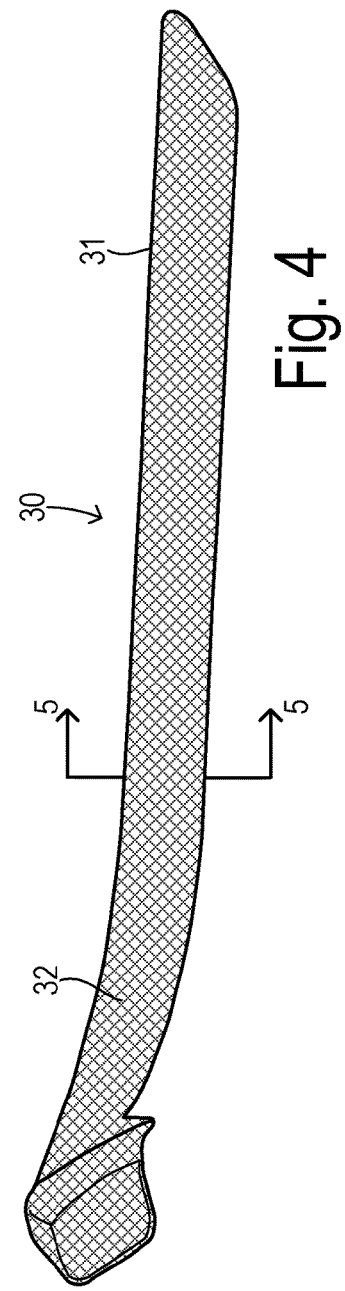

METHOD OF MANUFACTURING IN-MOLD DECORATIVE APPLIQUÉ WITH TEXTURED SURFACE

CROSS REFERENCE TO RELATED APPLICATIONS

This application is a division of U.S. application Ser. No. 12/841,221, filed Jul. 22, 2010, now U.S. Pat. No. 9,283,701, on Mar. 15, 2016, which is hereby incorporated by reference.

STATEMENT REGARDING FEDERALLY SPONSORED RESEARCH

Not Applicable.

BACKGROUND OF THE INVENTION

The present invention relates in general to molded automotive interior trim components, and, more specifically, to a decorative appliqué having an embossed pattern.

Interior trim systems for automotive vehicles typically include multiple trim sections mounted to various support structures in the vehicle. Some sections are abutting to give a substantially continuous surface, and others may be mounted remotely within a passenger cabin. Such trim systems may include instruments panels with multiple abutting sections, door trim systems, and ceiling trim. The interior trim components may provide various functions and are styled according to various decorative shapes and surface treatments.

A typical interior trim component comprises a plastic-molded part formed as an in-mold lamination, wherein a visible surface of the trim component is formed from a film or appliqué which is itself a thin molded plastic part with a pigment (e.g., paint or dye) layer on its outer side. The appliqué is placed in another mold where a structural backing member is injection molded against the appliqué resulting in a structurally rigid component with a desired decorative treatment on the visible surface.

Some interior trim components may include a curving or twisting surface, such as at the corners or other boundaries of an instrument panel. During molding of the appliqué/film, highly curved surfaces are typically formed using a deep draw mold process wherein a vacuum pulls an initially flat sheet onto a curved mold surface while being heated.

For styling purposes, it may be desired to utilize an appliqué having other than a monotone colored surface. For example, a printed or silk-screened ink pattern may be applied to the appliqué in order to provide a visually interesting surface. However, the pattern is most easily applied to the appliqué while it is a flat sheet and prior to molding into its approximate final shape. During deep drawing for forming a highly curved surface, the printed pattern distorts as the film stretches to conform with the deep draw mold. Consequently, the resulting pattern is not uniform, and the distorted appearance of the resulting trim component is undesirable.

SUMMARY OF THE INVENTION

In one aspect of the invention, a plastic-molded automotive interior trim component has a curvilinear finished surface with a relatively flat portion and a relatively curved portion. A decorative film subcomponent has an outer surface and an inner surface, wherein at least the outer surface is pigmented with a desired color of the finished surface. Prior to incorporation into the plastic molded component, the decorative film subcomponent has a shape generally conforming to the curvilinear finished surface and is substantially smooth. A structural backing member is in-mold laminated with the decorative film subcomponent, wherein the structural backing member is formed by injection molding a backing material against the inner surface of the decorative film subcomponent in a mold having a film-receiving surface with a three-dimensional texture that receives the decorative film subcomponent. The texture shapes the decorative film subcomponent with an embossed pattern having a substantially uniform, undistorted appearance on at least part of the relatively flat portion and at least part of the relatively curved portion.

BRIEF DESCRIPTION OF THE DRAWINGS

FIG. 3 is top view of a curved appliqué of the invention.

FIG. 4 is a front view showing a finished trim component using the appliqué of FIG. 3.

FIG. 5 is a cross-section of the trim component along lines 5-5 of FIG. 4.

DETAILED DESCRIPTION OF PREFERRED EMBODIMENTS

Figure 1:
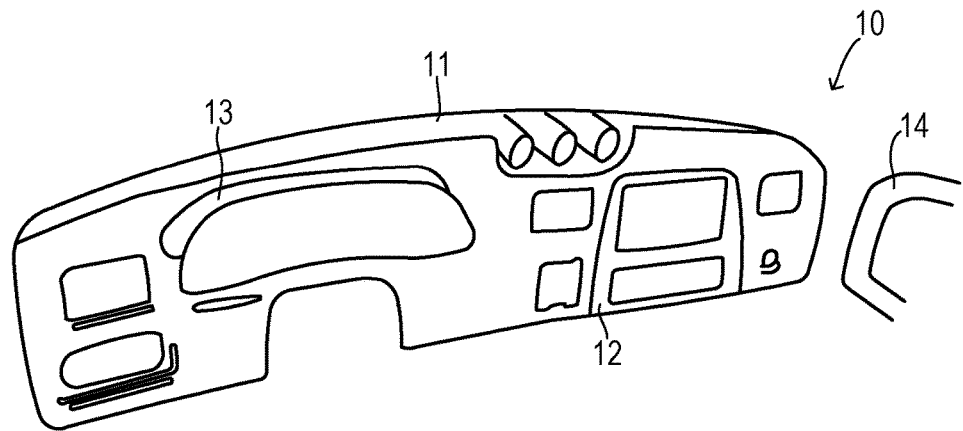
FIG. 1 is a perspective view showing an interior trim system for an automotive vehicle.

Referring now to FIG. 1, an interior trim system 10 is an example of a typical system having multiple trim components. Abutting trim components 11-13 provide interior trim surfaces for an instrument panel or dashboard. A door trim panel 14 typically has a consistent appearance with the instrument panel even though it is not abutting. While some components may be relatively flat (e.g., trim component 12), other components (e.g., components 11 and 13) have a curvilinear finished surface that may include both relatively flat portions and relatively curved portions. Since patterns applied to the decorative appliqués for deep drawing into a curved trim component would result in an undesirable distorted appearance, a smooth monotone surface treatment has been used for any such curved components. Since a consistent appearance across the entire trim system is desired, the same monotone surface treatment was usually required for the relatively flat components as well.

Figure 2:
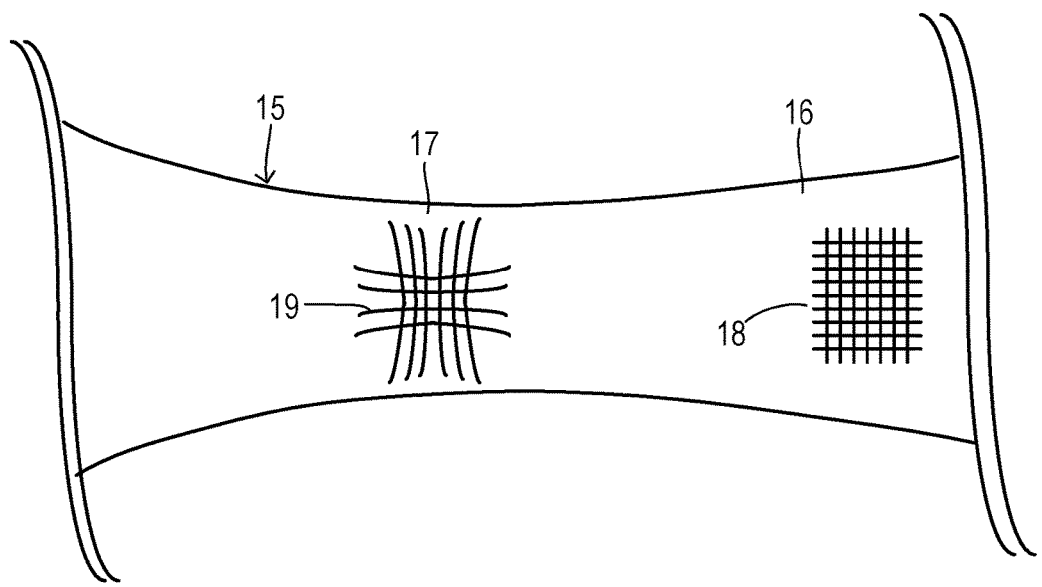
FIG. 2 is a plan view of an appliqué using surface printing that is distorted as a result of a deep draw mold.

FIG. 2 shows a prior art appliqué 15 with a relatively flat portion 16 and a relatively curved portion 17. A regular grid pattern (a portion of which is shown at 18) is printed over the entire sheet of appliqué 15 prior to molding. The deep draw molding of appliqué results in a distorted appearance as shown at 19. The present invention seeks to extend the undistorted appearance of the pattern into the deep drawn, relatively-curved portion, thereby allowing greater flexibility in the patterning of surface treatments for the entire interior trim system.

As shown in FIG. 3, an unprinted decorative film subcomponent 20 may be used in the present invention. Film 20 may be conventionally deep draw molded with a relatively flat portion 21 and a relatively curved portion 22. A further curved portion 23 is contiguous with another flat portion 24. Subcomponent 20 has an outer surface 25 and an inner surface 26. Preferably, outer surface 25 is substantially smooth. The overall shape of film subcomponent 20 is molded to approximately conform to a curvilinear finished surface of the finished interior trim component. For purposes of the present invention, conforming means that it is sufficiently close to its final shape to allow it to be placed into a final mold in which it will be in-mold laminated with a structural backing member by injection molding as is known in the art.

Outer surface 25 is smooth and monotone, although relatively flat portion 21 may also include graphic printing or other contrasting pigmentation as described later. At least outer surface 25 is pigmented with a desired color for the finished surface. The pigmentation may be from a paint or a dye, for example. Subcomponent 20 may be layered with the pigment being in only to outer surface 25, with other materials such as an adhesive forming inner surface 26.

In order to provide a substantially uniform, undistorted pattern covering both relatively flat portion 21 and relatively curved portion 22 of film subcomponent 20 in the final finished part, a backing material is injection molded against inner surface 26 of film subcomponent 20 in a mold having a film-receiving surface with a three-dimensional texture to emboss a desired pattern into film subcomponent 20. FIG. 4 is a front view of the embossed interior trim component 30 after injection molding. A consistent embossed pattern with a substantially uniform, undistorted appearance extends over relatively flat portion 31 and relatively curved portion 32 since the film subcomponent has already completed any stretching by the time it becomes embossed by pressing against the 3-D texture of the injection mold surface. As shown in cross-section in FIG. 5, the embossed film subcomponent 20 acts as a covering appliqué of structural backing member 33.

Figure 6:
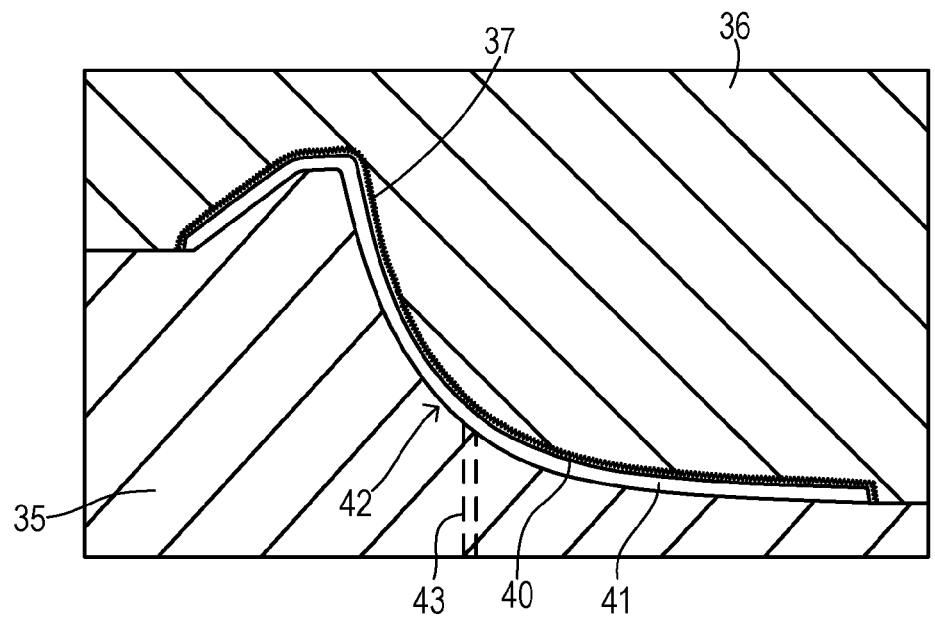
FIG. 6 is a cross-sectional view of an interior trim component of the invention while in a mold.

FIG. 6 shows the interior trim component in an injection mold apparatus having a core 35 and a cavity 36. Cavity 36 has a film-receiving surface 37 with an embossment/textured surface. The textured surface may include a regular, grid-like pattern, graining, stippling, or graphics or logos as desired. An appliqué 40 becomes embossed with the pattern upon injection molding of backing member 41. A curved section 42 of core 35 and cavity 36 corresponds to a deep draw contoured surface of appliqué 40. A molten plastic backing material is injected via channels in a conventional manner (such as channel 43) wherein pressure of the molten plastic material expands film subcomponent 40 against textured surface 37 to form an embossed pattern.

Figure 7:
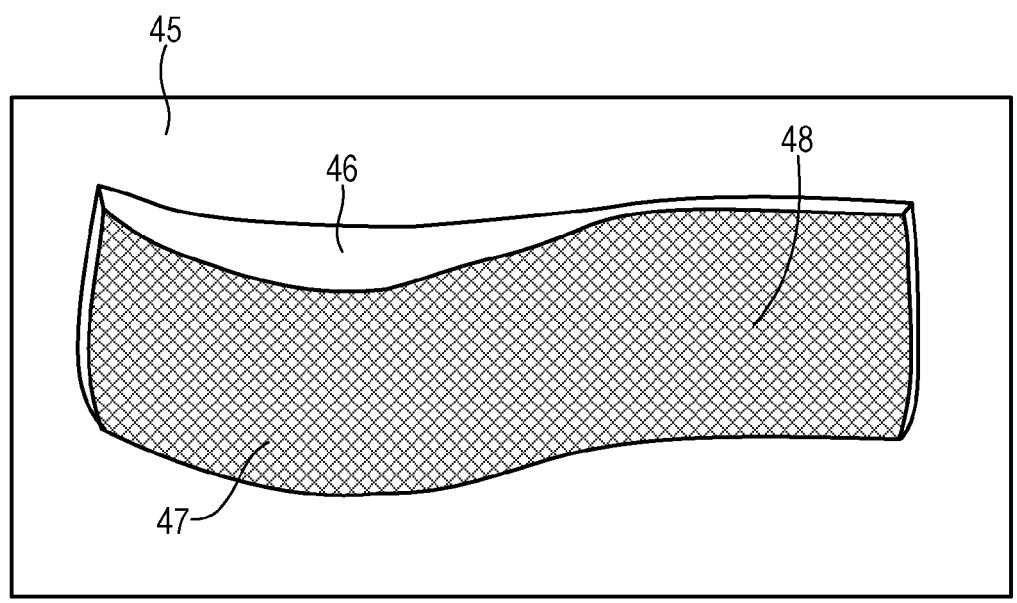
FIG. 7 shows an example of a film-receiving mold surface according to one embodiment of the present invention.

FIG. 7 illustrates another mold cavity 45 with a deep drawn contour section 46. A consistent grid-like pattern is applied to the film-receiving surface at both a relatively curved portion 47 and a relatively flat portion 48. The textured pattern may be created by laser etching, stamping, or other processes as known in the art.

Figure 8:
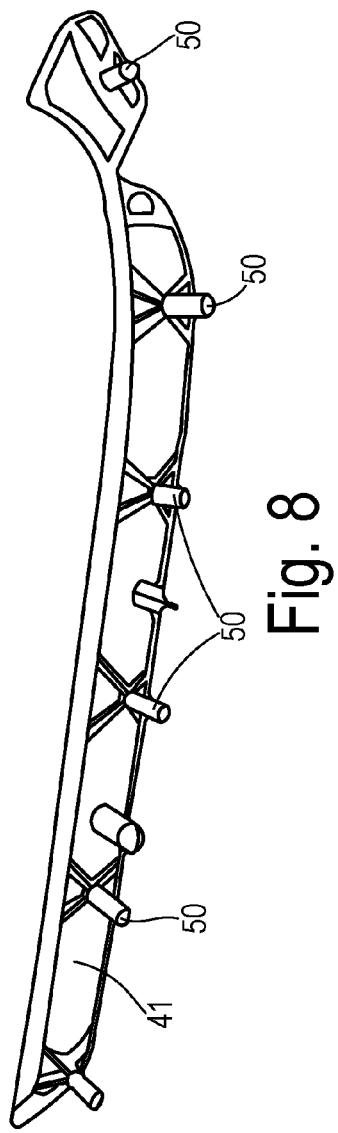
FIG. 8 is a rear, perspective view of a trim component.

FIG. 8 illustrates the finished trim component wherein a rear side 41 of the structural backing member includes bosses 50 and other support structures for interfacing with and connecting to various supports.

In addition to a consistent background surface treatment over substantially all of the trim component, the present invention may optionally use additional embossed features such as logos or other graphic patterns at either a relatively flat or relatively curved portion of the trimmed components. For the relatively flat portions where distortion of pre-printed graphics does not occur, then such printed graphics can also be utilized in the present invention either with or without corresponding embossed features.

Figure 9:
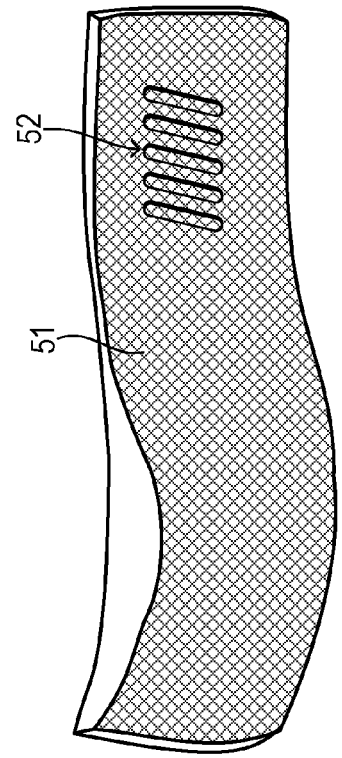
FIG. 9 shows a mold surface having an optional relief section.
Figure 10:
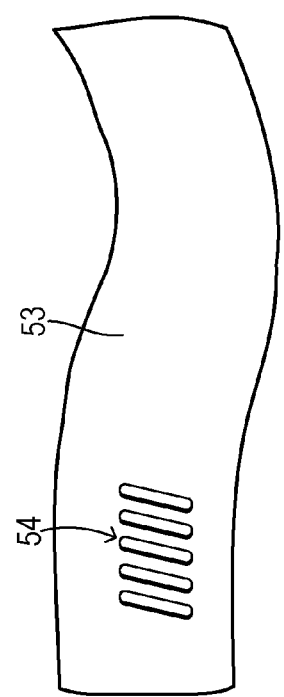
FIG. 10 shows an appliqué with a printed graphic corresponding to the relief section.

As shown in FIGS. 9 and 10, printed graphic features in a relatively flat portion may coincide with additional embossed features. FIG. 9 shows a film-receiving surface 51 having a regular grid-like texturing (such as graining, stippling, or other treatments) along with a relief section 52 wherein other raised or lowered embossment features are contoured into the mold. FIG. 10 shows a film subcomponent 53 with preprinted graphics 54 that are embossed according to relief section 52.

Figure 11:
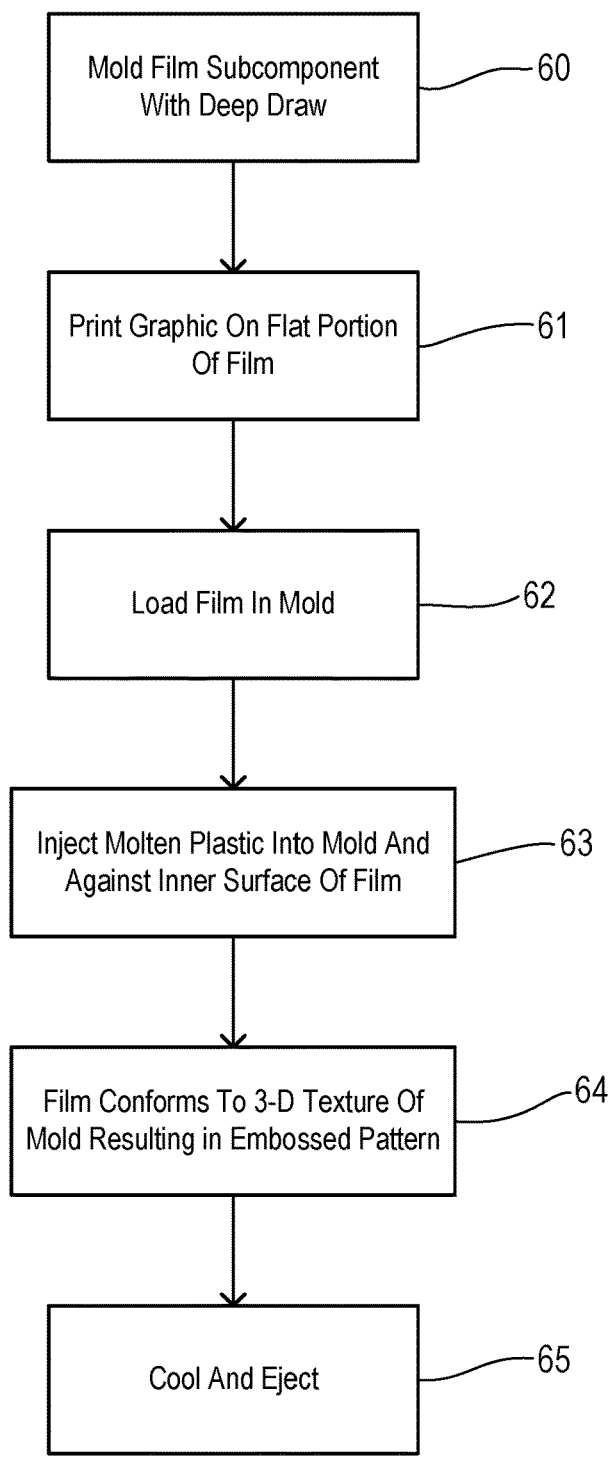
FIG. 11 is a flowchart showing a preferred method of the present invention.

One preferred method of the invention is shown in FIG. 11. A film subcomponent is molded with a deep draw section in step 60. The film may preferably have a smooth outer surface and monotone pigmentation. A graphic with contrasting pigmentation may be printed on a flat portion of the film subcomponent in step 61. Step 61 may alternately be performed prior to step 60 on the flat film sheet prior to molded of the film subcomponent. The film subcomponent is loaded into an injection mold in step 62. In step 63, molten plastic is injected into the mold against an inner surface of the film subcomponent. Pressure and heat of the injected plastic causes the film subcomponent to conform to the 3D texture of the film receiving surface of the mold resulting in the embossed pattern in step 64. The trim component with an embossed pattern on the visible surface is cooled and ejected from the mold in step 65. Thus, other than a provision of novel film receiving surface on the mold cavity, conventional molding processes and materials can be used in the present invention.

What is claimed is:

1. A method of manufacturing a plastic-molded automotive interior trim component having a curvilinear finished surface with a relatively flat portion and a relatively curved portion, comprising the steps of:

molding a decorative film subcomponent with a substantially smooth outer surface and an inner surface, wherein the decorative film subcomponent has a shape generally conforming to the curvilinear finished surface, and wherein at least the outer surface is pigmented with a desired color of the finished surface;

placing the decorative film subcomponent into a mold, wherein the mold has a film-receiving surface with a three-dimensional texture configured to emboss a consistent textured pattern having a substantially uniform, undistorted appearance on both the relatively flat portion and the relatively curved portion; and in-mold laminating a structural backing member with the decorative film subcomponent by injecting molten plastic material against the inner surface of the decorative film subcomponent in the mold to form a structurally rigid component, wherein pressure of the molten plastic material expands the decorative film subcomponent to form the embossed textured pattern in the decorative film subcomponent with a consistent appearance that is uniform and undistorted covering at least part of the relatively flat portion and at least part of the relatively curved portion.

2. The method of claim 1 wherein the three-dimensional texture is provided over substantially all of the film-receiving surface so that the embossed textured pattern of the decorative film subcomponent is comprised of a regular grid pattern repeating across substantially all of the outer surface.

3. The method of claim 1 wherein the decorative film subcomponent is molded using a deep draw contour at the relatively curved portion.

4. The method of claim 1 wherein the three-dimensional texture includes a relief forming a graphic element at the relatively flat portion, and wherein the embossed pattern continues over the graphic element.

5. The method of claim 4 further comprising the step of printing a contrasting pigment on the substantially smooth outer surface of the decorative film subcomponent at the relatively flat portion corresponding to the relief so that the graphic element has a distinctive color and three-dimensional texture.

\* \* \* \* \*